US006857689B2

United States Patent
Dodgen

(10) Patent No.: US 6,857,689 B2
(45) Date of Patent: Feb. 22, 2005

(54) TILTABLE BED/SOFA FOR RV VEHICLE

(75) Inventor: John N. Dodgen, Humboldt, IA (US)

(73) Assignee: Dodgen Industries, Inc., Humboldt, IA (US)

( * ) Notice: Subject to any disclaimer, the term of this patent is extended or adjusted under 35 U.S.C. 154(b) by 0 days.

(21) Appl. No.: 10/624,372

(22) Filed: Jul. 22, 2003

(65) Prior Publication Data

US 2005/0015875 A1 Jan. 27, 2005

(51) Int. Cl.[7] .............................................. B60R 15/00
(52) U.S. Cl. ........................................ 296/156; 5/118
(58) Field of Search ............................ 296/156; 5/118

(56) References Cited

U.S. PATENT DOCUMENTS

| | | | | |
|---|---|---|---|---|
| 3,984,140 A | * | 10/1976 | Robertson .................... | 296/156 |
| 4,173,045 A | * | 11/1979 | Osborn .......................... | 5/118 |
| 4,539,722 A | * | 9/1985 | Broussard ..................... | 5/118 |
| D281,379 S | * | 11/1985 | Isham et al. .................. | 5/118 |
| 4,589,612 A | * | 5/1986 | Halim ............................ | 5/118 |
| 4,594,817 A | * | 6/1986 | McLaren et al. .............. | 52/34 |
| 4,603,900 A | | 8/1986 | Dodgen | |
| 4,620,335 A | * | 11/1986 | Dodgen ......................... | 5/118 |
| 4,989,281 A | * | 2/1991 | Christensen ................... | 5/118 |
| 5,701,826 A | | 12/1997 | Dodgen | |
| 5,787,522 A | * | 8/1998 | Swihart ......................... | 5/118 |
| 6,604,471 B1 | * | 8/2003 | Tarver, Jr. ..................... | 108/40 |
| 6,691,952 B2 | * | 2/2004 | Keogh ........................... | 5/118 |
| 6,735,797 B1 | * | 5/2004 | Long et al. .................... | 5/118 |

* cited by examiner

Primary Examiner—Lori L. Coletta

(57) ABSTRACT

A recreational vehicle suite has a combination bed and sofa, a floor, a side wall and an end wall. A TV viewing screen is located in the proximity of the of the end wall for viewing from the bed and sofa. A bench is supported on the floor and has a head portion and a foot portion. An elongated normally horizontal cushion/mattress is mounted on a top of the bench and normally covers the bench including the head and the foot portions. The cushion/mattress has a head portion normally covering the head portion of the bench and is connected to a foot portion of the cushion/mattress. The bench is able to tilt the head portion of the cushion/mattress upwardly at an angle with respect to the bench.

5 Claims, 4 Drawing Sheets

TILTABLE BED/SOFA FOR RV VEHICLE

BACKGROUND OF THE INVENTION

In the compact confines of recreational vehicles ("RV's"), it is common to have elongated upholstered benches for sitting also used as beds for sleeping. However, the elongated benches are often not comfortable for viewing television while in bed. Also, the horizontal beds are not desirable for persons having certain stomach acidity problems.

It is therefore a principal object of this invention to provide a tiltable bed/sofa for RV vehicles where the head portion of the bed/sofa can be tilted upwardly to the benefit of a person lying thereon to better view television while lying thereon, or to better combat the stomach acidity problems.

A further object of the invention is to provide a tiltable bed/sofa for RV vehicles which can easily and quickly have a head portion thereof tilted, or moved to a horizontal position at the will of the user.

These and other objects will be apparent to those skilled in the art.

BRIEF SUMMARY OF THE INVENTION

A recreational vehicle suite has a combination bed and sofa, a floor, a side wall and an end wall. A TV viewing screen is located in the proximity of the of the end wall for viewing from the bed and sofa.

A rectangularly shaped hollow bench is supported on the floor and has a head portion and a foot portion with the end wall being opposite the head portion. An elongated normally horizontal cushion/mattress is mounted on a top of the bench and normally covers the bench including the head and the foot portions. The cushion/mattress has a head portion normally covering the head portion of the bench and is hingedly connected to a foot portion of the cushion/mattress.

A power means is within the bench for tilting the head portion of the cushion/mattress upwardly at an angle with respect to the bench, so that a person lying on the cushion/mattress with their head resting on the head portion thereof can better view the screen when the head portion is in the tilted position.

A control means adjacent the head portion is operatively connected to the power means to permit a person lying in the aforesaid position to selectively tilt the head portion.

DESCRIPTION OF THE PREFERRED EMBODIMENT OF THE INVENTION

Figure 1:
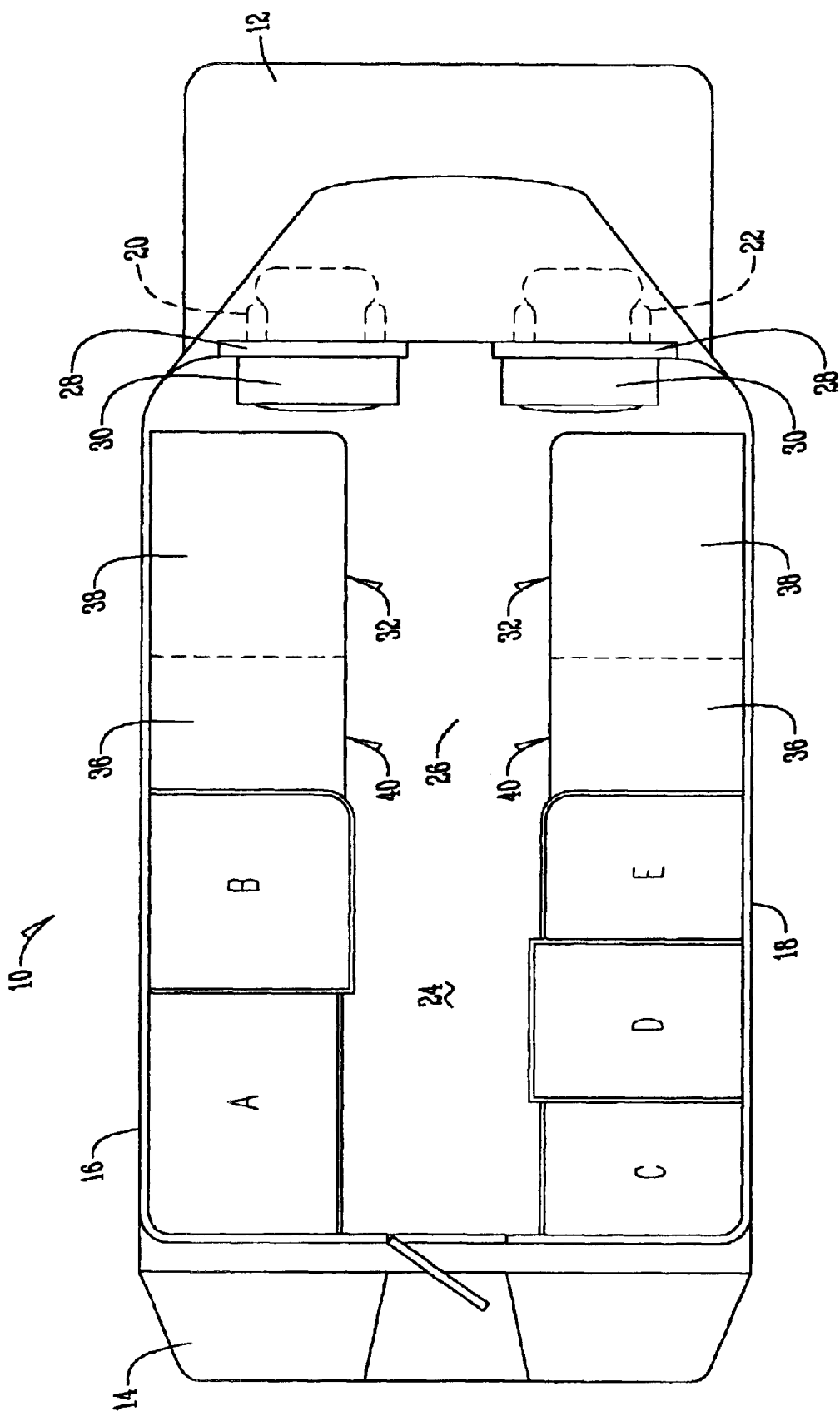
FIG. 1 is a plan view of an RV showing the location of the of the device of this invention.

With reference to FIG. 1, an RV vehicle 10 has a front end 12, rear end 14, and sides 16 and 18. A driver's chair 20 and passenger chair 22 are conventionally mounted in the front end 12 of the vehicle.

A living compartment 24 has a floor 26 and forward wall panels 28. One or more TV screens 30 can be mounted on wall panels 28. The areas A, B, C, D, and E are typically used as a space for a bathroom, sink, closet, refrigerator and stove respectively.

Figure 5:
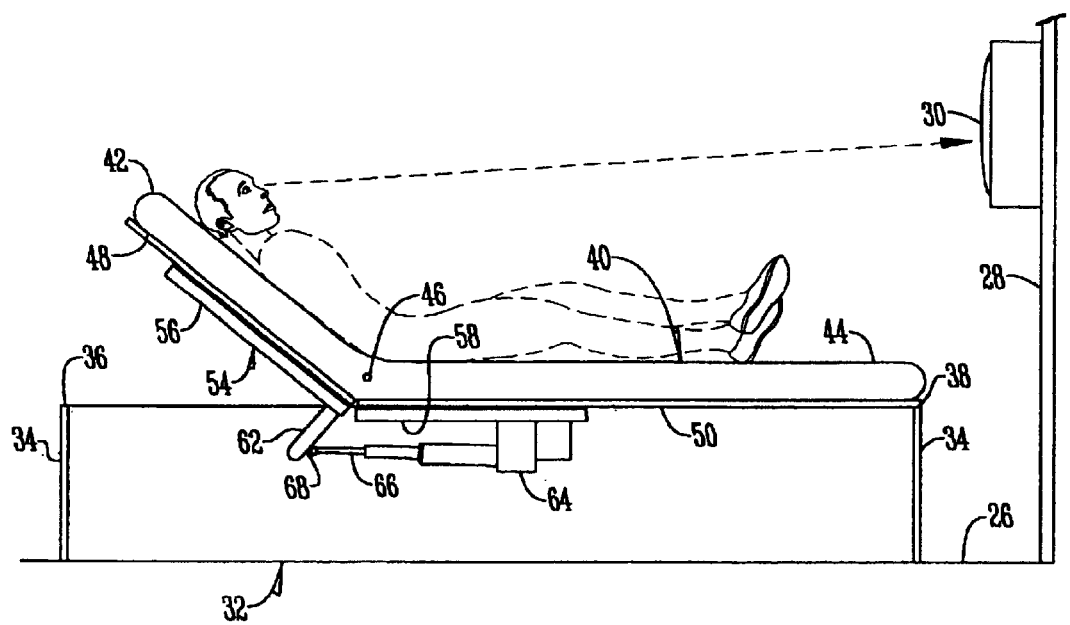
FIG. 5 is an elevational view similar to FIG. 4 but with the cushion/mattress in a tilted position.
Figure 6:
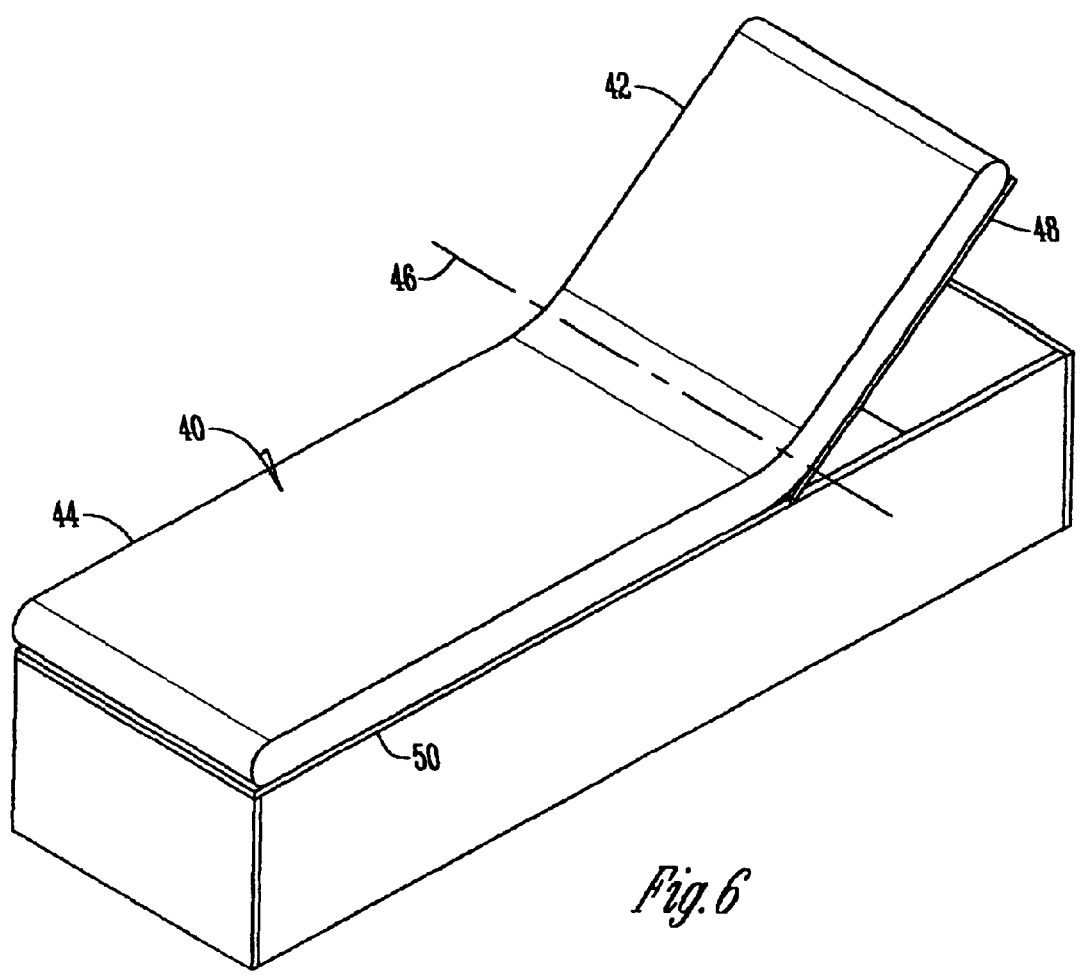
FIG. 6 is a perspective view of the bed/sofa in a tilted position.

A bench 32 has end walls 34 (FIG. 5), a head portion 36 and a foot portion 38. A cushion/mattress 40 is deployed on the upper portion of the bench and has a head portion 42 and a foot portion 44 separated by a bend line 46 (FIG. 6).

Figure 2:
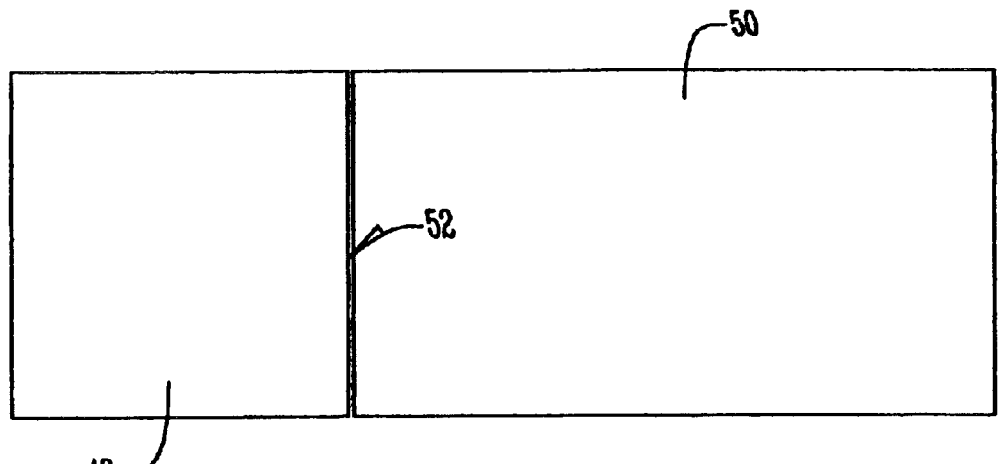
FIG. 2 is a top plan view of the sofa/bed support structure with the cushion/mattress removed.
Figure 3:
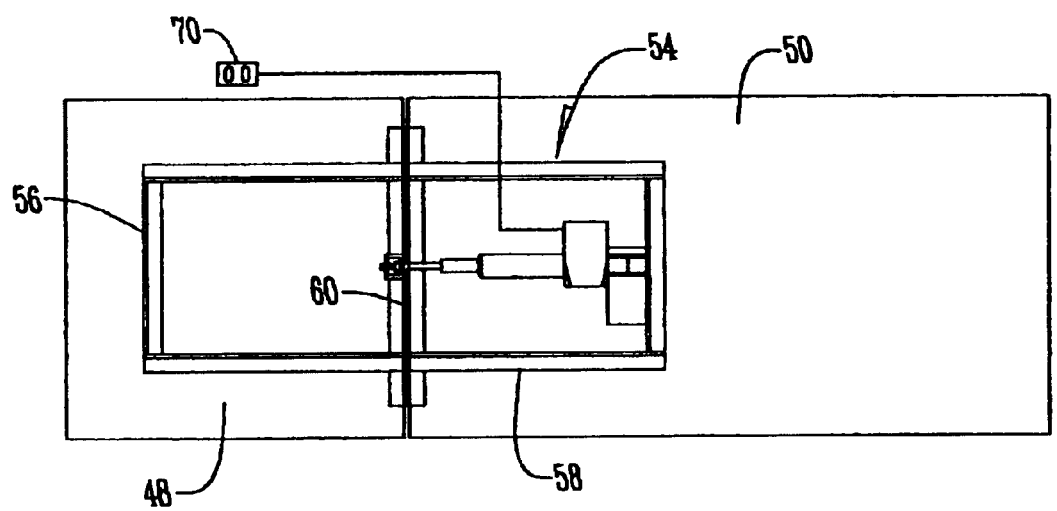
FIG. 3 is a bottom plan view of FIG. 2 showing the tilting mechanism of the cushion/mattress.

As best shown in FIGS. 2 and 3, a pair of support panels 48 and 50 exist underneath the cushion/mattress 40 to support the cushion/mattress. A narrow elongated transverse space 52 exists between adjacent edges of the panels 48 and 50 (FIG. 2).

Figure 4:
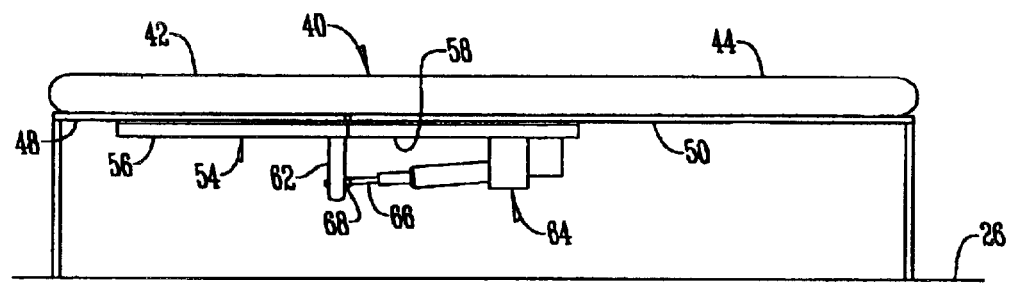
FIG. 4 is a side elevational view of the sofa/bed with the cushion/mattress in a non-tilted position.

A structural metal frame 54 is located on the underneath side of the support panels 48 and 50 as best shown in FIG. 3. A first portion 56 of the frame 54 is secured at any convenient way to the panel 48, and a second portion 58 of the frame is secured in any convenient way to the panel 50. An elongated hinge 60 extends between the portions 56 and 58 of the frame 54. An arm 62 is rigidly secured to the first frame portion 56 and extends vertically downwardly therefrom. An electric hoist 64 is rigidly secured to the second frame portion 58 and has a telescopic rod 66 extending outwardly therefrom towards arm 62 and is pivotally secured to arm 62 at point 68 in any convenient manner. An electric hoist 64 suitable for use in this invention is a 12 volt Linak model LA31. A wired or wireless control 70 is located adjacent the head portion 42 of the cushion/mattress 40 so that a person lying thereon can control the electric hoist 64. As shown in FIGS. 4 and 5, the electric hoist 64 can exert pressure on arm 62 which will tilt the head portion 42 of the cushion/mattress 40, and the first frame portion 56 upwardly to the inclined position shown in FIGS. 5 and 6.

Back cushions (not shown) can be leaned against the exterior sides 16 and 18 while resting on the cushion/mattress 40 when the bench 32 is being used as a sofa. Those cushions are removed when the bench is to be used as a bed or resting place.

If the person resting on the bench wished to have the head portion of the cushion/mattress elevated to the position of FIGS. 5 and 6 from the horizontal position of FIG. 4, the control 70 is actuated in a conventional way to energize the electric hoist 64 to cause the head portion 36 to move from the horizontal position to the tilted position shown in FIGS. 5 and 6. This tilted position will alleviate any acidic reflux experienced by the person lying on the bench. More importantly, it will provide an excellent viewing posture for the person to view the TV screen 30 as best shown in FIG. 5.

It is therefore seen that this invention will achieve at least all of its stated objectives.

What is claimed is:

1. A recreational vehicle suite having a floor, a side wall and an end wall, comprising:
   a rectangularly shaped hollow bench supported on the floor and having a head portion and a foot portion, with the end wall being opposite the head position,
   an elongated normally horizontal cushion/mattress mounted on a top of the bench and normally covers the bench including the head and the foot portions,
   the cushion/mattress having a head portion normally covering the head portion of the bench and having a foot portion of the cushion/mattress, a TV viewing screen located in the proximity of the end wall of the suite for viewing, a power means within the bench for tilting the head portion of the cushion/mattress upwardly at an angle with respect to the bench, so that a person lying on the cushion/mattress with their head resting on the head portion thereof can better view the screen when the head portion thereof is in the tilted position, and a control means adjacent the head portion of the cushion/mattress is operatively connected to the power means to permit a person lying in the aforesaid position on the cushion/mattress to selectively tilt the head portion.

2. The device of claim 1 wherein a support frame is located underneath the cushion/mattress and has a first frame portion hingedly connected to a second frame portion with the front and second frame portions being located below the head portion and the foot portion of the cushions, respectively; with the power means being connected to the first and second frame portions to tilt the head portion of the cushion/mattress with respect to the foot portion thereof.

3. The device of claim 1 wherein a support frame is located underneath the cushion/mattress and has a first frame portion hingedly connected to a second frame portion with the front and second frame portions being located below the head portion and the foot portion of the cushions, respectively; with the power means being connected to the first and second frame portions to tilt the head portion of the cushion/mattress with respect to the foot portion thereof between aligned and angular portions.

4. The device of claim 1 wherein the power means is an electrical hoist.

5. The device of claim 4 wherein the power means includes a base secured to one frame portion, and an extendible arm extending from the base portion the other frame portion so that the movement of the arm can be extended or withdrawn to tilt the frames with respect to each other.

* * * * *